United States Patent [19]

Jones, Jr.

[11] E Re. 28,941

[45] Reissued Aug. 24, 1976

[54] ELECTROLYTIC TIMER DELAY CAPSULE

[75] Inventor: John Paul Jones, Jr., Wayne, Pa.

[73] Assignee: Air Products and Chemicals, Inc., Allentown, Pa.

[22] Filed: Apr. 20, 1973

[21] Appl. No.: 352,895

Related U.S. Patent Documents

Reissue of:

[64] Patent No.: 3,711,751
Issued: Jan. 16, 1973
Appl. No.: 106,481
Filed: Jan. 14, 1971

[52] U.S. Cl. ..... 317/232; 317/230; 324/94

[51] Int. Cl.[2] ..... H01G 9/18

[58] Field of Search ..... 317/230, 231, 232; 324/94, 182

[56] References Cited

UNITED STATES PATENTS

| | | | |
|---|---|---|---|
| 3,052,830 | 9/1962 | Ovshinsky | 317/231 |
| 3,222,654 | 12/1965 | Widrow et al. | 317/231 |
| 3,355,731 | 11/1967 | Jones | 324/94 |
| 3,395,402 | 7/1968 | Widrow et al. | 317/231 X |
| 3,423,642 | 1/1969 | Plehal et al. | 317/231 |
| 3,423,648 | 1/1969 | Mintz | 317/231 |
| 3,679,945 | 7/1972 | Sekido et al. | 317/231 |

*Primary Examiner*—William D. Larkins
*Attorney, Agent, or Firm*—James C. Simmons; Barry Moyerman

[57] ABSTRACT

An electrolytic timer capsule is constructed of an outer cylindrical closed end case and an inner insulated upside down cup enclosing an electrolyte solution. The case comprises one electrode and the other is a U-shaped wire with an intermediate thin coined section immersed in the electrolyte solution.

12 Claims, 2 Drawing Figures

INVENTOR
JOHN PAUL JONES, JR.

BY Lawrence R. Brown
ATTORNEY

ELECTROLYTIC TIMER DELAY CAPSULE

Matter enclosed in heavy brackets [ ] appears in the original patent but forms no part of this reissue specification; matter printed in italics indicates the additions made by reissue.

This invention relates to electrolytic timer devices operable to electroplate from a metallic electrode and more particularly it relates to expendible electrolytic timer devices which signify the expiration of a predetermined time period by rupture of the conductive path of an electric conductor. Circuits for such timer devices are described in my U.S. Pat. No. 3,355,731.

If a timer device is expendible it must be simple and low in cost, and yet must be accurate and precise in signifying a predetermined time period. Low cost timer devices must be adaptable to define different time periods without custom tailoring. When the rupture of a conductor is sensed, there should be a quick transition between the conductive and non-conductive conditions. The device should be capable of defining the breaking period exactly without significant changes of the conductor appreciably until the specified time period has expired.

Also the cost of assembly of an expendible timer device is significant and therefore simple and effective configuration of a device (hereinafter referred to as a capsule) is desirable.

It is therefore an object of this invention to provide an improved timer capsule which satisfies the foregoing conditions.

A particular object of the invention is to provide a simple capsule configuration which is expensive to manufacture without disturbing the timing accuracy.

The foregoing objectives are realized in accordance with this invention together with further features and advantages by provision of a metallic electrode which is plated away in the form of a single piece of wire having an intermediate portion coined to provide a ribbon like section adapted for insertion into an electrolyte solution.

Figure 1:
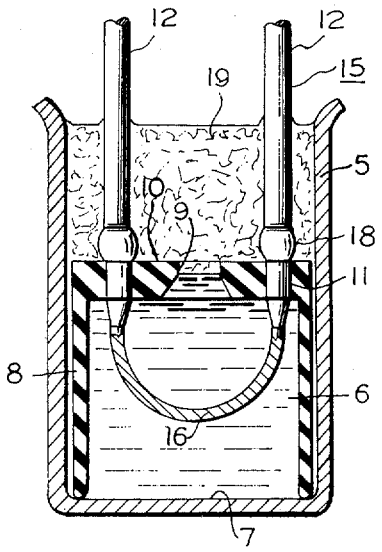
Figure 2:
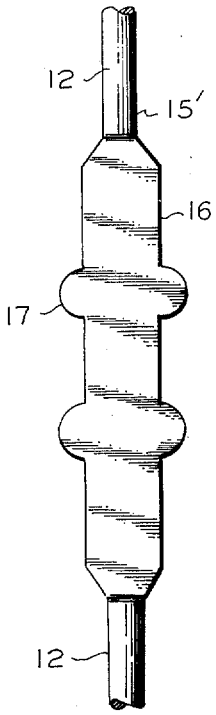

A preferred embodiment of the invention is shown in the accompanying drawing, wherein:

FIG. 1 is a cross section elevation view of a timing capsule constructed in accordance with the invention, and FIG. 2 is a plan view illustrating construction of an anode electrode which is electro-plated off in the timing operation.

As may be seen from the drawing, a timing capsule comprises an outer non-corrosive cylindrical metal can or case 5 which may be nickel for example. This case 5 forms a cathode electrode which is in contact with an electrolyte plating solution 6 in the interior of the case 5 and in conductive electrical contact with the cathode at end wall 7.

The electrolyte solution 6 is contained in a cavity formed by the inverted insulating cylindrical cup member 8 which snugly fits within the inner y diameter of case 5 to confine the electrolyte solution 6 to conductive contact with the case 5 only at the end wall 7. The electrolyte solution may be entered into its cavity by means of a hypodermic syringe or the like through aperture 9 in the bottom of cup member 8 to a level substantially reaching to the bottom 10 of cup member 8.

Two further apertures 11 are located in the bottom of cup member 8 to pass the two ends 12 of the anode electrode member 15.

This anode electrode 15 is a metal that is plated away when a potential is connected between it and the cathode case member 5 that reacts with electrolyte solution 6. A copper wire for example may be used with a copper sulphate solution.

In order to determine an exact time for the rupture of the conductive path between the two leads 12 with a constant electric current flow between the cathode and anode electrodes, the cross section and area of the portion 16 of the anode electrode 15 extending into the electrolyte solution 6 must be precisely controlled.

In accordance with this invention therefore the anode electrode 15 comprises a single piece of wire, which can readily be obtained with a known precise diameter. The wire is then coined at the intermediate section 16 in an appropriate die to have a ribbon-like section of significantly greater area exposed to the electrolyte solution. Thus the dimensions and surface area are controlled precisely and inexpensively.

As shown in FIG. 2, the ribbon section 16 may have at least one intermediate portion 17 that is thinner and presents an even greater surface area for plating off through the electrolyte solution so that the rupture will occur at controlled positions. This is used for fast-break control of the rupture of the anode wire, without substantially increasing the resistance between ends 12 as the anode wire becomes very nearly ruptured as might occur with a longer uniformly etched very thin wire portion. In this manner the time period to rupture can be more accurately controlled.

The anode number 15 is then bent into a U-shaped configuration and supported in the apertures 11 in cup member 8. The anode member 15 may be locked into the cup 8 by a further indentation or coining operation outside the bottom 10 as shown at 18.

After the electrolyte 6 is inserted within the upside-down cup member 8, a sealer wax or epoxy 19 fills the top of can case 5 which is longer than the cup member 8, and therefore extends beyond the bottom 10 of the cup member 8.

In operation the U-shaped portion 16 extending within the electrolyte solution 6 is of significant shape. If the member is pointed or V-shaped for example, there will be a rupture at the apex at a time much faster than will occur for the U-shaped section, because of the concentration of the electric field through electrolytic solution 6 between anode member 15 and the cathode case 5.

By use of the U-shaped anode portion 16 within the electrolyte 6 and by [confirming] *confining* the electrical [control] *contact* of the electrolyte with cathode case 5 at the end wall 7 by means of the insulating upside-down cup member 8, there is a controlled electric field configuration of the timer element that assures uniform time periods to the rupture of the conductive path between lead ends 12.

In an electrolytic timer capsule operating on the principle of detection of the rupture of the conductive path between two extending ends 12 of the anode member 15 by electroplating away the intermediate portion 16 disposed in the electrolytic solution 6, it is desirable to maintain a reasonably high resistance in the electrolyte solution between the ruptured ends of the anode member 15 so that the time period expiration may be sensed by relatively simple electronic circuits. Accordingly the electrolyte solution 6 may be doped with any substances that increases the resistivity of the electrolyte. This provides for a heavy concentration of ions in a concentrated electrolyte solution that controls the plating process without producing such a low resistivity that the rupture of the anode portion 16 would be difficult to detect. An example of a substance for increasing resistivity of the electrolyte solution would be an alcohol or alcohol derivative.

What is claimed is:

1. An electrolytic timer device for use in electrical circuits detecting the rupture of a circuit conductive path after a predetermined time period of electroplating away an electrode member in said path comprising in combination, an electrolyte solution, an electrode comprising an elongated single piece of metal, substantially uniform in mass along its length, having two ends and having an intermediate portion disposed in said electrolyte solution with at least part of said portion presenting a thinner section and greater area to said electrolyte solution than said ends.

2. A device as defined in claim 1 wherein the piece of metal comprises a substantially U-shaped piece of wire.

3. A device as defined in claim 2 wherein the shaped wire is coined to produce said thinner section within said electrolyte.

4. A device as defined in claim 1 wherein the electrolyte has a high enough resistance to provide a significant change of resistance between said two ends when the portion of said electrode within the electrolyte is ruptured.

5. A device as defined in claim 2 wherein substantially the entire portion of said wire within the electrolyte is coined to provide a thinner portion and wherein an intermediate section is coined to provide a thinner portion than the remaining portion.

6. A device as defined in claim 1 including a second electrode comprising a cover can containing said electrolyte.

7. A device as defined in claim 6 wherein the can is cylindrical with one closed end, a cylindrical insulating cup of a size approximating the internal diameter of said can inserted within the cover can with its bottom in an upside-down orientation to produce a substantially closed internal cavity having the cover can in contact with the electrolyte only at the end of the can cylinder, said insulating cup being in its bottom provided with three apertures, two for passing said ends of the first mentioned electrode therethrough and one for inserting electrolyte within said internal cavity.

8. A device as defined in claim 7 wherein the can cylinder is longer than the cup cylinder with electrolyte confined to the region within said cup, and with a closure material in said can cylinder reaching to said electrolyte at substantially the level of the bottom of said cup.

9. A device as defined in claim 7 wherein the first mentioned electrode has a substantially U-shaped portion extending into said electrolyte with the apex directed toward the region at the end of said can in contact with said electrolyte to establish an electric field pattern therewith of known configuration.

[10. A device as defined in claim 1 having an electrolytic solution with a substance therein increasing the resistivity thereof.]

*11. An electrolytic timer device for use in electrical circuits detecting rupture of a circuit conductive path after a predetermined time period of electroplating away an electrode member in said path comprising in combination, a cathode electrode, an anode electrode of conductive metal wire comprising a source of metal to be plated away until the wire ruptures, and an electrolyte solution between said electrodes causing said anode electrode wire to plate away on said cathode electrode and rupture said wire wherein the anode wire electrode has two leads presented for connection to said electrical circuits for detection of rupture therebetween and the portion of said wire intermediate the leads is immersed in said solution and means producing a concentrated electric field pattern on a portion of said anode said means being formed by the configuration of said anode wire into a shape presenting said portion as a single small apex part of its total length to protrude into a position significantly closer than the remainder of its length to said cathode with the electrolyte solution therebetween thereby assuring continued etching at said portion producing uniform time periods to rupture of the wire by electroplating when a d-c potential source is connected between said cathode and anode wherein said cathode is a cup-shaped container with an open mouth and a closed bottom having only the closed bottom exposed to said electrolyte, said two leads constitute an integral continuous portion of said anode wire disposed in said electrolyte with the leads extending from said container, and wherein said protruding portion is disposed with its apex directed toward the closed bottom of said container.*

*12. In an electrolytic timer capsule having two electrodes and an electrolyte therebetween, the combination comprising, an outer cup forming a first of said electrodes, an inner cup of plastic material inserted upside-down into said electrode to form a cavity confining the electrolyte between said cups, a second electrode comprising a length of wire, and means passing the second of said electrodes through said inner cup with a continuous portion extending into said electrolyte cavity, and two ends extending out of the capsule so that the wire may be electrolytically broken by electric current passed between the electrodes and detected by a change of continuity between said two ends.*

*13. A capsule as defined in claim 12 wherein said continuous portion is U-shaped with the ends disposed away from the bottom of the electrode cup.*

* * * * *